US009349197B2

(12) United States Patent
Chen et al.

(10) Patent No.: US 9,349,197 B2
(45) Date of Patent: May 24, 2016

(54) LEFT VENTRICLE EPICARDIUM ESTIMATION IN MEDICAL DIAGNOSTIC IMAGING

(75) Inventors: Mingqing Chen, Iowa City, IA (US); Yefeng Zheng, Dayton, NJ (US); Kerstin Mueller, Erlangen (DE); Christopher Rohkohl, Bochum (DE); Günter Lauritsch, Nürnberg (DE); Jan Boese, Eckental (DE); Gareth Funka-Lea, Cranbury, NJ (US); Dorin Comaniciu, Princeton Junction, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 467 days.

(21) Appl. No.: 13/533,234

(22) Filed: Jun. 26, 2012

(65) Prior Publication Data

US 2013/0004040 A1 Jan. 3, 2013

Related U.S. Application Data

(60) Provisional application No. 61/501,948, filed on Jun. 28, 2011.

(51) Int. Cl.
*G06K 9/00* (2006.01)
*G06T 11/00* (2006.01)
*G06T 7/20* (2006.01)

(52) U.S. Cl.
CPC ............ *G06T 11/005* (2013.01); *G06T 7/2046* (2013.01); *G06T 2207/10081* (2013.01); *G06T 2207/30048* (2013.01); *G06T 2211/412* (2013.01)

(58) Field of Classification Search
None
See application file for complete search history.

(56) References Cited

U.S. PATENT DOCUMENTS

| 5,375,156 | A | * | 12/1994 | Kuo-Petravic et al. ............ 378/9 |
| 5,690,106 | A | * | 11/1997 | Bani-Hashemi et al. ..... 600/425 |
| 6,106,466 | A | * | 8/2000 | Sheehan et al. ............... 600/443 |
| 6,385,332 | B1 | * | 5/2002 | Zahalka et al. ............... 382/128 |
| 7,433,504 | B2 | | 10/2008 | Delschinger et al. |
| 7,689,021 | B2 | * | 3/2010 | Shekhar et al. ............... 382/131 |
| 8,842,154 | B2 | * | 9/2014 | Pace ................... G06K 9/00261 348/14.01 |
| 8,971,584 | B2 | * | 3/2015 | Wang ........................ G06T 7/20 382/107 |
| 9,147,268 | B2 | * | 9/2015 | Chen ..................... G06T 7/2046 |
| 2005/0238233 | A1 | * | 10/2005 | Mulet Parada et al. ........ 382/199 |
| 2006/0171586 | A1 | * | 8/2006 | Georgescu et al. ........... 382/173 |

(Continued)

OTHER PUBLICATIONS

G. Lauritsch, J. Boese, L. Wigstrom, H. Kemeth, and R. Fahrig, "Towards cardiac C-arm computed tomography," IEEE Trans. Medical Imaging, vol. 25, pp. 922-934, 2006.

(Continued)

*Primary Examiner* — Nancy Bitar

(57) ABSTRACT

The left ventricle epicardium is estimated in medical diagnostic imaging. C-arm x-ray data is used to detect an endocardium at different phases. The detected endocardium at the different phases is compared to sample endocardiums at different phases. The sample endocardiums have corresponding sample epicardiums. The transformation between the most similar sample endocardium or endocardiums over time and the detected endocardium over time is applied to the corresponding sample epicardium or epicardiums. The transformed sample epicardium over time is the estimated epicardium over time for the C-arm x-ray data.

17 Claims, 3 Drawing Sheets

(56) References Cited

U.S. PATENT DOCUMENTS

| | | | |
|---|---|---|---|
| 2007/0071295 A1* | 3/2007 | Jackson | 382/128 |
| 2009/0003680 A1* | 1/2009 | Lautenschlager .. | A61B 5/02007 382/132 |
| 2010/0027861 A1* | 2/2010 | Shekhar et al. | 382/131 |
| 2011/0238059 A1* | 9/2011 | Swanson | A61B 18/16 606/33 |
| 2013/0294667 A1* | 11/2013 | Zheng | G06T 7/0012 382/131 |

OTHER PUBLICATIONS

G. P. Penney, J. Weese, J. A. Little, P. Desmedt, D. L. G. Hill, and D. J. Hawkes, "A comparison of similarity measures for use in 2-d3-d medical image registration," IEEE Trans. Medical Imaging, vol. 17, No. 4, pp. 586-595, 1998.

Y. Zheng, M. John, R. Liao, J. Boese, U. Kirschstein, B. Georgescu, S. K. Zhou, J. Kempfert, T. Walther, G. Brockmann, and D. Comaniciu, "Automatic aorta segmentation and valve landmark detection in C-arm CT: Application to aortic valve implantation," in Proc. Int'l Conf. Medical Image Computing and Computer Assisted Intervention, 2010.

D. Schafer, J. Borgert, V. Rasche, and M. Grass, "Motion-compensated and gated cone beam filtered back-projection for 3D rotational X-ray angiography," IEEE Trans. Medical Imaging, vol. 25, No. 7, pp. 898-906, 2006.

C. Blondel, G. Malandain, R. Vaillant, and N. Ayache, "Reconstruction of coronary arteries from a single rotational X-ray projection sequence," IEEE Trans. Medical Imaging, vol. 25, No. 5, pp. 653-663, 2006.

M. Prummer, J. Honegger, G. Lauritsch, L. Wigstrom, E. Girard-Hughes, and R. Fahrig, "Cardiac C-arm CT: A unified framework for motion estimation and dynamic CT," IEEE Trans. Medical Imaging, vol. 28, No. 11, pp. 1836-49, 2009.

M. Chen, Y. Zheng, K. Mueller, C. Rohkohl, G. Lauritsch, J. Boese, G. Funka-Lea, J. Hornegger, and D. Comaniciu, "Automatic extraction of 3D dynamic left ventricle model from 2D rotational angiocardiogram," in Proc. Int'l Conf. Medical Image Computing and Computer Assisted Intervention, 2011.

Y. Wang, B. Georgescu, D. Comaniciu, and H. Houle, "Learning-based 3D myocardial motion flow estimation using high frame rate volumetric ultrasound data," in Proc. IEEE Int'l Sym. Biomedical Imaging, 2010.

B. Georgescu, X. S. Zhou, D. Comaniciu, and A. Gupta, "Database-guided segmentation of anatomical structures with complex appearance," in Proc. IEEE Conf. Computer Vision and Pattern Recognition, pp. 429-436, 2005.

Y. Zheng, X. S. Zhou, B. Georgescu, S. K. Zhou, and D. Comaniciu, "Example based non-rigid shape detection," in Proc. European Conf. Computer Vision, pp. 423-436, 2006.

Y. Zheng, A. Barbu, B. Georgescu, M. Scheuering, and D. Comaniciu, "Four-chamber heart modeling and automatic segmentation for 3D cardiac CT volumes using marginal space learning and steerable features," IEEE Trans. Medical Imaging, vol. 27, No. 11, pp. 1668-1681, 2008.

L. Yang, B. Georgescu, Y. Zheng, Y. Wang, P. Meer, and D. Comaniciu, "Predication based collaborative trackers (PCT): A robust and accurate approach toward 3D medical object tracking," IEEE Trans. Medical Imaging, 2011.

F. Bookstein, "Principal warps: Thin-plate splines and the decomposition of deformations," IEEE Trans. Pattern Anal. Machine Intell., vol. 11, No. 6, pp. 567-585, 1989.

* cited by examiner

LEFT VENTRICLE EPICARDIUM ESTIMATION IN MEDICAL DIAGNOSTIC IMAGING

RELATED APPLICATIONS

The present patent document claims the benefit of the filing date under 35 U.S.C. §119(e) of Provisional U.S. Patent Application Ser. No. 61/501,948, filed Jun. 28, 2011, which is hereby incorporated by reference.

BACKGROUND

The present embodiments relate to medical diagnostic imaging. In particular, the left ventricle epicardium is estimated as part of medical diagnostic imaging.

Many cardiac interventions use real-time angiocardiogram imaging provided with a C-arm system. By rotating an X-ray source and detector on a C-arm, a 3D computed tomography (CT) volume may be reconstructed. C-arm CT has advantages compared to conventional CT. However, C-arm CT has challenges.

One specific challenge for the imaging of the heart is cardiac motion and respiratory motion. Electrocardiogram (ECG) gated CT reconstruction and breath holding compensate for motion and may be applied to C-arm CT. However, the X-ray source and detector typically sweeps the patient 5-6 times to capture enough 2D projection data for each cardiac phase. It is difficult for the patient to hold their breath during the whole procedure (e.g., during 30 seconds). Longer acquisition time may also incur more radiation dose.

It is desirable to reconstruct a CT volume with a single sweep of the C-arm X-ray source and detector. However, one rotation of a C-arm generates only about five 2D projections for each cardiac phase (e.g., about 130 2D projections with about 26 phases). Five 2D projections may be too few for adequate CT reconstruction. To make full use the projection data, the projections from different cardiac phases are aligned to the target phase in motion compensated reconstruction. Accurate estimation of the 3D motion from 2D rotational angiocardiogram is used to align to the target phase.

For this motion compensated reconstruction, the 3D motion for each voxel inside the volume is estimated. The motion may be estimated most easily for highly contrasted structures, such as heart chambers and aorta filled with contrast, and bones. However, accurate estimation of motion of some structure may be difficult. The motion of lowly contrasted structures, such as the epicardium of the left ventricle, may be difficult to estimate. The boundary contrast of the epicardium in an angiocardiogram is so low that even an expert may not be able to segment accurately. Rather than rely on possibly inaccurate detection of lowly contrasted structures, the motion for some voxels may be interpolated from the voxels associated with highly contrasted structures. However, interpolation may be an inaccurate approximation.

BRIEF SUMMARY

By way of introduction, the preferred embodiments described below include a method, system, instructions, and computer readable media for left ventricle epicardium estimation in medical diagnostic imaging. C-arm x-ray data is used to detect an endocardium at different phases. The detected endocardium at the different phases is compared to sample endocardiums at different phases. The sample endocardiums have corresponding sample epicardiums. A transformation between the most similar sample endocardium or endocardiums over time and the detected endocardium over time is applied to the corresponding sample epicardium or epicardiums. The transformed sample epicardium over time is the estimated epicardium over time for the C-arm x-ray data.

In a first aspect, a method is provided for left ventricle epicardium estimation in medical diagnostic imaging. C-arm x-ray data representing a left ventricle of a patient over time is acquired. An endocardium over time is detected from the C-arm x-ray data. A processor identifies at least one motion template from a library of motion templates. The identification is based on a similarity of the endocardium over time detected from the C-arm x-ray data with an endocardium of the at least one motion template. The processor calculates a deformation field as a function of a difference between the endocardium of the at least one motion template and the endocardium detected from the C-arm x-ray data. The processor applies the deformation field to an epicardium represented by the at least one motion template. An image of the left ventricle of the patient is displayed. The image is a function of the epicardium as deformed by the applied deformation field.

In a second aspect, a non-transitory computer readable storage medium has stored therein data representing instructions executable by a programmed processor for left ventricle epicardium estimation in medical diagnostic imaging. The storage medium includes instructions for selecting a first endocardium surface from a library of endocardium surfaces based on matches in shape over time from a second endocardium surface for a patient, determining a distortion of the selected first endocardium surface to the second endocardium surface, applying the distortion to a first epicardium surface associated with the selected endocardium surface and from the library, and estimating a second epicardium surface of the patient as the first epicardium surface.

In a third aspect, a system is provided for left ventricle epicardium estimation in medical diagnostic imaging. A memory is configured to store C-arm x-ray data representing a left ventricle over at least one heart cycle. A processor is configured to determine endocardium motion based on the C-arm x-ray data and a template of endocardium motion and configured to estimate an epicardium location over the at least one heart cycle from the endocardium motion.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Left ventricle epicardium estimation is based on endocardium shape and motion. The epicardium estimation may be applied in motion-compensated DynaCT or C-arm CT reconstruction of a volume or plane.

The motion of the endocardium and epicardium is tightly coupled since they are the inner and outer layers attached to the myocardium, respectively. The myocardium is a soft tissue but is almost incompressible. The change in the myocardium volume across the whole cardiac cycle may be less than 5%. Normally, the thickness of myocardium is from 6 to 11 mm. The close distance between the endocardium and epicardium makes it possible to estimate the epicardium from the endocardium. If the motion of an endocardium segment is abnormal, such as with almost no motion, the corresponding epicardium motion may be close to static too.

The epicardium is estimated from the endocardium. Combining the shape and motion of the endocardium, the epicardium may be estimated. It may be difficult to estimate the epicardium shape from a static shape of the endocardium based on single cardiac phase. Since the motion of the heart is quite regular and close to periodic, the shape may be estimated over multiple phases. The estimated epicardium over time is used to perform a more intelligent interpolation of the motion field for motion-compensated reconstruction.

LV epicardium estimation uses example templates. A library of coupled endocardium and epicardium motion template models is used. Given an unseen input sequence with a known or detectable endocardium, the similarity of the input endocardium and each motion template is determined. The similarity is based on shape and motion analysis to select the best or most similar motion template. The epicardium of the selected motion template is warped toward the input sequence using a deformation field calculated from the endocardium.

Figure 1:
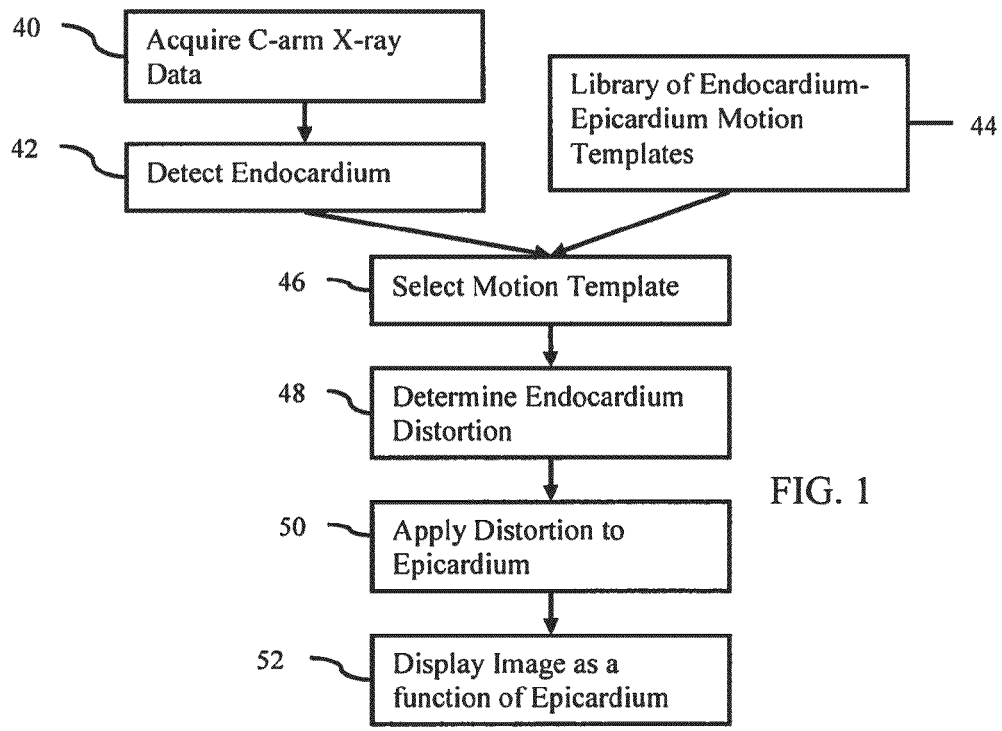
FIG. 1 is a flow chart diagram of one embodiment of a method for left ventricle epicardium estimation in medical diagnostic imaging.

FIG. 1 shows a method for left ventricle epicardium estimation in medical diagnostic imaging. The epicardium through a plurality of phases for a given patient is estimated by deforming the epicardium of a model or motion template. The deformation is based on the transform of the endocardium for that patient to an endocardium of the model or motion template. The spatial distribution of the tissue structure over space and time or motion of the tissue structure is used to estimate the epicardium.

Additional, different, or fewer acts may be performed. For example, act 44 is not provided, and act 46 is just receiving a given motion template. As another example, act 52 is not provided. The motion or position over time of the epicardium may be used for reconstruction without imaging.

The acts of FIG. 1 are implemented by the system 10 of FIG. 6 or a different system. The acts are performed in the order shown or a different order.

In act 40, C-arm x-ray data is acquired. The data represents a left ventricle of a patient over time. A C-arm holds a detector and x-ray source on different sides of a patient. The C-arm is moved by a gantry in a helical (e.g., translation and rotation) or other pattern (e.g., translation without rotation) about the patient. Any angiocardiogram sequences may be used. During the movement, the x-ray source emits x-rays detected by the detector. Since a given detection represents attenuation along a path from the x-ray source to the detector, the received data is projection data. The projection data may be reconstructed a two-dimensional distribution of tissue, bone, fluid, contrast agents or other objects within the patient. By obtaining projections from different positions about the patient, data representing a volume of the patient along a three-dimensional grid is obtained.

Using a C-arm image acquisition system, a 3D reconstructed computed tomography (CT) image may be reconstructed from 2D projections. Due to cardiac motion, the reconstructed 3D image may be blurred due to averaging from all projections belonging to different cardiac phases. Different from a traditional CT scanner, the gantry's speed in C-arm CT is much slower. In a C-arm angiography scan or sweep, the gantry may take about five to six seconds to rotate 200 degrees around a patient, generating about 133 fluoroscopic images (projection images). A single sweep is one rotation and/or translation of the x-ray source and detector about the patient in a given direction. If only a single sweep of the C-arm is applied, there are a limited number of projection images available for each cardiac phase (e.g., 5), which results in reconstruction artifacts due to missing data and residual motion. Using only projection images from the same cardiac phase may significantly reduce motion blurring for sparse high contrast organs, such as vessels. However, this approach may fail for large low-contrast organs, such as the left ventricle.

Tissue motion estimation may be used to reduce blurring and use projections from different phases in reconstruction to the three-dimensional grid from the two-dimensional images or reconstructions. A single C-arm scan is used, but two or more scans or sweeps about the patient may be used. Using a single sweep, a plurality of 2D projection images is received. In one embodiment, the 2D projection images are fluoroscopic images acquired by a C-arm image acquisition system in a single scan.

The C-arm x-ray data for the projections or volume represents a heart of the patient. The entire heart or a portion of the heart is scanned. In particular, at least part of the left ventricle and corresponding epicardium and endocardium are scanned. The C-arm x-ray data represents at least part of the endocardium and epicardium.

The projection images may be received directly from a C-arm image acquisition system. Alternatively, the projection images may be previously acquired images loaded from memory or storage of a computer system.

In act 42, the endocardium is detected from the C-arm x-ray data. The detection is repeated at different times or uses data from different times for detection to identify the endocardium at different phases of one or more heart cycles. The endocardium is detected as a surface, such as a three-dimensional surface. Alternatively, the endocardium is detected separately in two-dimensions or planar images. Detection in one planar image based on detection in other planar images may be used.

Any detection may be used. For example, the data is filtered or a binary image is created. Edge detection is applied to distinguish the endocardium from the enclosed blood region. Directional filtering may be applied. As another example, a template is matched to the data. The detection may be for a given phase. Tracking is used to determine the endocardium for other phases. Alternatively, the matching or other detection relies on data from different phases and detects the endocardium at the different phases.

In one embodiment, the detection disclosed in U.S. Pat. No. 8,923,590, granted Dec. 30, 2014 and titled "Method and System for 3D Cardiac Motion Estimation from Single Scan of C-arm Angiography", the disclosure of which is incorporated herein by reference, is used. The endocardium surface is detected from C-arm x-ray data obtained in a single sweep. A static 3D mesh, which is the segmentation result of the volume reconstructed from all of the projections of a single C-arm scan, is initialized. In each projection image, a 2D contour of target organs is pre-segmented. The static mesh is projected to each of the 2D projection images. The 2D contours are used to deform the static mesh. A cardiac phase is assigned to each projection mesh. Then, for each cardiac phase, the static mesh is deformed by transforming its projection silhouette to a 2D contour in all of the projection images that belong to that cardiac phase. Thus, for each cardiac phase, a deformed mesh is derived based on all of the 2D contours corresponding to the cardiac phase and the projected mesh in each of the 2D projection images of that cardiac phase.

In act 44, a library of motion templates is provided. The motion templates represent the endocardium and epicardium. The endocardium and epicardium are represented as surfaces, such as one mesh for the endocardium and one mesh for the epicardium. The surfaces may be a collection of locations in a three-dimensional grid, a surface defined by a mathematical function, or a mesh of vertices and links. Other representations of the endocardium and epicardium may be provided.

For motion, the motion templates represent the endocardium and epicardium at different phases of the heart cycle. Each template is a sample endocardium and epicardium through at least one heart cycle. Any number of phases may be represented, such as two or more (e.g., about 20).

The motion templates are models. Different models represent different conditions (e.g., various healthy and diseased positioning and motion). Different conditions may result in different characteristics. For example, a given part of the myocardium may be static for one condition or hyper active for another condition. A model is provided for each. Different patients or type of patients may present different positioning or motion for a same condition. Different models may be provided to reflect this variance. Any number, such as tens or hundreds, of motion templates may be stored in the library. Each motion template is different than the other motion templates, such as having at least one different shape or spatial location for at least one phase.

The motion templates are provided from any source. In one embodiment, the motion templates are programmed or computer generated. For example, a programmer inputs the models. As another example, machine training creates the models based on a plurality of training samples with expert delineated or feature extracted endocardium and epicardium surfaces. The samples are based on C-arm x-ray data for previous patients. Data from other modalities may be used.

In one embodiment, computed tomography (CT) or magnetic resonance (MR) data is used to generate the library of motion templates. The high resolution of CT or MR may allow easier detection of the endocardium and epicardium. The library may be generated using CT or MR modes, and the resulting templates applied against subsequently acquired C-arm x-ray data for different patients. Different patients are used for the different motion templates. The CT or MR data from the different patients is used to generate the motion templates.

The MR and/or CT data is used to generate a plurality of dynamic left ventricle (LV) mesh sequences. For example, the library is built from the segmentation results from four dimensional (e.g., volume over time) cardiac CT scans.

For each phase, the LV meshes (e.g., endocardium and epicardium surfaces) are automatically segmented. Any segmentation may be used. For example, a four-chamber automatic segmentation is applied. Marginal space learning with steerable features is used to identify the surfaces. For example, a bounding box of the left ventricle is detected.

Then, a pre-trained mean shape represented as a triangulated mesh is aligned with the detected bounding box as an initial estimate of surface of the left ventricle endocardium and epicardium. A machine learning-based boundary detector is used for more accurate surface boundary delineation. Other machine learning, thresholding, filtering, region growing, skeletonization, or segmentation may be used. The results of the automated detection may be edited manually. In other approaches, the segmentation is performed manually, such as by tracing.

To compare two mesh sequences, the two sequences should have the same number of points with anatomical correspondence in each phase. By using a same detection, the number of points representing the surface may be fixed. Different types of detection may be used, but configured to provide a mesh with a same number of points. Sub-sampling, extrapolation, interpolation, decimation, or other approaches may be used to provide surfaces represented by a same number of points.

To compare two mesh sequences, the two sequences should have the same number of phases. Each sequence of detected LV meshes contains evenly distributed cardiac phases. ECG or other triggering may be used to start and/or end the sequence at a particular phase. The number of phases sampled from a cardiac cycle may vary across scans. For example, 4D cardiac CT may have various phases depending on the settings and systems used to acquire the CT data. To equalize the number of phases, the mesh sequence is resampled into a fixed number (e.g., 10) of phases. Bilinear or other interpolation is used. Alternatively, a function is fit to the data over time and the function is resampled to the desired number of phases. Other temporal transforms may be used. The result is the fixed number (e.g., 10) of meshes for each sequence.

The motion templates are a collection of surfaces over multiple phases. In one embodiment, assume that a mesh sequence M contains T phases and each phase contains K mesh points. The mesh sequence contains T×K points (p1, p2, . . . pTK), and may be considered as a vector in a 3×T×K dimensional space.

The motion templates are normalized. To exclude the information irrelevant to shape, the mesh sequence is translated, scaled and rotated toward a common shape, such as in a Procrustes analysis. The conversion may occur in any order. For example, the mesh sequence for each template is first translated so that the center or other predefined location is located at an origin or other location in a coordinate system. Any definition of center may be used. In one embodiment, the center is the average of all the mesh points throughout the sequence:

$$P_{center} = (1/TK)\Sigma p_i \text{ from } i=1 \text{ to } TK. \tag{1}$$

The surfaces are scaled. After translation, a norm of the mesh sequence is computed. For example, the norm may be mathematically expressed as:

$$s = (1/TK) \text{sqrt of } (\Sigma(p_{ix}^2 + p_{iy}^2 + p_{iz}^2)) \text{ from } i=1 \text{ to } TK) \tag{2}$$

The mesh sequence is spatially normalized by dividing coordinates of each mesh point by s. Other scaling may be used.

The surfaces of the motion template are normalized for rotation. The rotation among shapes is removed so that the templates represent the left ventricle in a same orientation. Suppose the endocardium mesh points of a given motion template A is denoted as a 3×K matrix, with each column representing three coordinates of a mesh point:

$$A = \begin{matrix} A_{1x} & A_{2x} & \ldots & A_{Kx} \\ A_{1y} & A_{2y} & \ldots & A_{Ky} \\ A_{1z} & A_{2z} & \ldots & A_{Kz} \end{matrix} \qquad (3)$$

One orientation is chosen as the reference. A reference motion template B is used for orienting the other motion templates. Given the shape B, which is also represented as a 3×K matrix, the optimal rotation that aligns A toward B is calculated. The rotation may be represented as a 3×3 rotation matrix R, which is orthogonal (e.g., along x, y and z). The residual error after transformation is measured as the sum of squared distance (SSD):

$$\|R-B\|_2, \qquad (4)$$

where the subscript 2 represents the degree of norm of the matrix. A singular value decomposition (SVD) method is used to compute R that minimizes SSD $$[U,S,V] = SVD(AB^T), \qquad (5)$$

where AB, U, S, V are all 3×3 matrices. The rotation matrix may be computed as $R = VU^T$. To align the rotation of two mesh sequences, the rotation matrix is computed for each phase. The overall rotation matrix is an average of all the phases, where $R=(1/T)\Sigma R_i$ from i=1 to T. Other rotational normalization may be used. Other or no normalization for scale, translation, and/or rotation may be used. For example, the CT data for forming the templates is acquired with standardized settings and patient positioning using one type of system.

The detected endocardium from the C-arm x-ray data may be normalized as well. The position, scale, and rotation of the endocardium surface may be transformed to a common position, scale and rotation. Alternatively, the C-arm x-ray data is acquired to provide the endocardium at the desired position, scale, and orientation.

In act 46, a motion template is selected. The motion template is selected from the library. The shapes are matched. The characteristics of a given patient are reflected in the endocardium surface detected in act 42. This information is used to select a motion template. The selection is based on the endocardium surfaces. Given a new sequence of LV endocardium meshes, the meshes detected from the C-arm x-ray data is compared with the motion templates in the library. The motion template with a sufficiently or most closely matching endocardium surface to the endocardium surface detected in act 42 is selected. The motion template closest to the input data is chosen as the best motion model for the estimation of the epicardium.

The comparison or matching is of the shape over time. To capture the motion, the surfaces of the different phases are compared. In alternative embodiments, the matching is performed for just one phase or fewer than all phases. It may be more accurate to perform epicardium estimation using the whole endocardium mesh sequence, rather than each phase within the sequence separately. The similarity or matching is performed for each of the phases and a combined value or level of similarity calculated.

The selection is performed with a processor. The selection is automated. A similarity is calculated between the detected endocardium from act 42 and the endocardiums of the motion templates in the library. The similarity incorporates motion by including values for similarity over time or a similarity representing the match of the shapes at different phases.

Levels of similarity between the detected endocardium from act 42 and all or a sub-set of the motion templates are calculated. The similarity calculation is repeated for each of the motion templates.

In one embodiment, the similarity or matching is calculated as a difference between the endocardium detected from the C-arm x-ray data and the endocardium of each of the motion templates of the library at each of a plurality of heart cycle phases. Any measure of similarity may be used, such as a correlation or minimum sum of absolute differences.

In one embodiment, a distance measurement is used for the similarity. After Procrustes analysis, only the shape information is kept in the mesh sequence vector. Given an input endocardium sequence from act 42, the best motion template of the epicardium in the motion library is picked based on the distance measurement between the input endocardium and template endocardium. The distance measurement indicates similarity through the sequence, so provides both shape and motion based similarity. An example distance measurement reflecting matching includes the Procrustes distance, d:

$$d = \mathrm{sqrt}(\Sigma((p_{Akx}-p_{Bkx})^2 + (p_{Aky}-p_{Bky})^2 + (p_{Akz}-p_{Bkz})^2)) \qquad (6)$$

where the sum is from i=1 to TK. An alternative distance is deformation field energy. In one embodiment, an average of the point-to-mesh error is used. For each point in mesh A, the closest distance to mesh B is found. The error is then the average of all the points in A. The error from different phases may be averaged. The endocardium sequence of the motion template library with the smallest error relative to the detected endocardium is chosen.

By including the differences over multiple phases, such as by averaging, a spatial-temporal match is provided. The surfaces represent space. The surfaces at different times provide temporal matching. The level of similarity over multiple phases is used to select the motion template most similar to the endocardium of the current patient. The lesser value of the average difference or distance indicates a best match. The higher value of a similarity or matching may indicate a best match. The spatial-temporal match is used to select the endocardium surface from the library.

In an alternative embodiment, more than one motion template is selected. For example, two or more (e.g., five) most similar motion templates are selected. By calculating the similarity with each endocardium surface of the library, a ranked list is created. The highest ranked or most similar motion templates are selected from the library.

In act 48, a distortion is determined. The distortion from the endocardium surface of the selected motion template to the detected endocardium surface is calculated. A processor calculates a deformation field. The deformation field may be the differences between the endocardium surfaces. The deformation field represents the differences to make the two surfaces the same. Alternatively, the deformation field is a function of the differences with limitations, such as spring, plate, bending, or other cost functions. The deformation represents a transform without exact matching.

Where more than one motion template is selected in act 46, the differences from the multiple endocardiums are used to calculate the differences or distortion. The differences between the detected endocardium and each of the selected endocardiums are used to determine a distortion. The distortion is a collection of differences from different templates or a collection of averaged differences.

The distortion may be a field of values. Different locations are distorted or offset or not. The field represents a deformation in spatial position of different locations in each of the selected endocardiums from the library. The field indicates a fitting of the modeled endocardium from the library to the detected endocardium of a given patient. This fitting may be applied to an epicardium surface to distort the epicardium surface.

In one embodiment, the difference between the endocardiums is determined with a non-rigid deformation. The endocardium of the motion templates is transformed toward the input endocardium using a nonrigid deformation. For example, a thin plate spline (TPS) function is used to interpolate the field of differences. The TPS is a coordinate interpolation approach. A physical energy function is minimized, as represented by:

$$E = \Sigma \|f(x_i) - y_i\|^2 + \lambda \iint ((d^2z/dx^2)^2 + 2(d^2z/dxdy)^2 (d^2z/dy^2)^2) dxdy \quad (7)$$

where the first term is the interpolation error of the anchor points and the second term is a bending energy of the transformation of a "thin plate." The parameter $\lambda$ is tuned appropriately to control the balance between exact mapping of anchor points and rigidness of deformation. The endocardium mesh points are used to estimate the TPS transformation field. Other functions may be used.

In act 50, the distortion calculated from the endocardium surfaces is applied to the epicardium surface or surfaces. The selected motion template or templates include endocardium and epicardium surfaces. The distortion field indicates a transform of the motion template endocardium to the endocardium of a particular patient. Since the epicardium generally follows or has related motion to the endocardium, the same distortion field may be applied to the epicardium of the motion template to determine the epicardium for a given patient. The modeled epicardium is warped to the coordinate system of the input C-arm x-ray data.

The deformed epicardium from the motion template is the estimate of the epicardium for the patient. The deformed epicardium is used as the epicardium of the patient.

The mesh or epicardium surface is transformed based on the field. The non-rigid transform is applied. The locations of the epicardium are deformed based on the transform. A processor applies the deformation field. The field represents the amount of distortion and the transform provides the function used for the transform. The same transformation as used to calculate the deformation, such as TPS, is used. Alternatively, a different transformation is used. For example, the deformation field represents spatial offsets for different locations. The locations forming the epicardium surface are offset accordingly.

Reasonable epicardium estimation accuracy may be achieved using a single motion template. More consistent accuracy may be provided by using multiple motion templates. For example, two, three, four, five or more motion templates are selected to calculate the deformation. The deformation field is applied to the epicardium surfaces of the same two or more motion templates.

The deformed epicardiums may be combined. For example, the deformed epicardiums are averaged. Other combination functions may be used, such as weighted averaging or bilinear interpolation. The combination may incorporate the distortion of the epicardium rather than pre-distorting and combining. In one embodiment, the Nadaraya-Watson kernel-weighted average is used. The Nadaraya-Watson kernel-weighted average may be represented as:

$$\hat{S} = (\Sigma K_k(d_i) S_i) / (\Sigma K_k(d_i)) \text{ from } i=1 \text{ to } M \quad (8)$$

where $d_i$ is the endocardium distance (e.g., the averaged point-to-mesh distance of the distortion field), M is the number of selected motion templates, and $S_i$ is the estimated epicardium based on each motion template I. For the kernel $K_k$, the Epanechnikov quadratic kernel:

$$K_k(d_i) = \frac{3}{4}(1-(d_i/d_{[k]})^2) \text{ if } d_i \leq d_{[k]}, \text{ otherwise} = 0 \quad (9)$$

where k is the size of the neighborhood, and $d_{[k]}$ means the distance to the $k^{th}$ nearest motion template. Any neighborhood size may be used, such as 5 or 3. Using kernel-based smoothing, the estimated epicardium shape is not restricted to those represented in the library. The estimated epicardium is, in part, based on the C-arm x-ray data for the patient, such as through the detected endocardium. Any shape may be represented as a linear combination of several base shapes in general. Other combinations, functions, kernels, or smoothing functions may be used.

In act 52, an image is displayed. The image represents the left ventricle of the patient. The image is a function of the epicardium as deformed. The sequence of epicardium positions estimated in act 50 is used to represent motion. Positions at different phases may be used in reconstruction. The C-arm x-ray projection data from different phases is reconstructed while accounting for the motion of the epicardium. Using the motion of the epicardium and the endocardium, images with less blurring but more rapid acquisition (e.g., single sweep) may be generated. The reconstruction provides data representing locations in a plane or volume.

The image is a two-dimensional representation of a planar region. For example, the image is part of a multi-planar reconstruction showing standard (e.g., A4C, A2C . . . ) views of the heart. Alternatively, the image is rendered from a volume, such as using projection or surface rendering. The image is a three-dimensional rendering of a volume to a two-dimensional display from a viewing direction. Any imaging may be used.

Figure 4:
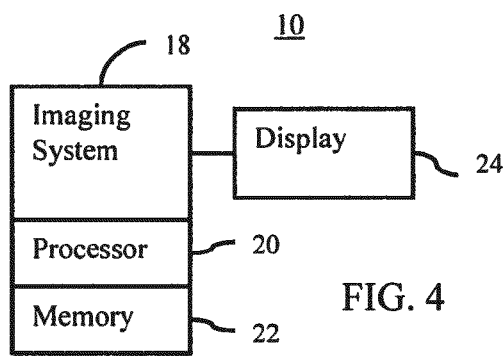
FIG. 4 is a block diagram of one embodiment of a system for left ventricle epicardium estimation in medical diagnostic imaging.

FIG. 4 shows a system 10 for left ventricle epicardium estimation in medical diagnostic imaging. The system 10 implements the method of FIG. 1 or a different method. The system 10 includes an imaging system 18, a processor 20, a memory 22, and a display 24. Additional, different, or fewer components may be provided. For example, the system 10 includes a user interface. In one embodiment, the system 10 is a medical diagnostic imaging system. For example, the imaging system 18 is a computed tomography system with a C-arm, x-ray source, and detector as well as the processor 20, memory 22, and display 24. In alternative embodiments, the imaging system 18 is a magnetic resonance, ultrasound, positron emission, photon emission, x-ray, or other imaging system for scanning a patient. In other embodiments, the processor 20 and/or memory 22 are part of a workstation or computer different or separate from the imaging system 18. The workstation is adjacent to or remote from the imaging system 18.

The imaging system 18 causes a scan of an internal region of a patient and generates data representing the region as a function of the scanning. The data used by the processor 20 for estimating the epicardium is at any stage of processing. For example, the data is projection data prior to reconstruction. As another example, the data is reconstructed data representing a three-dimensional object or planar region. The data may include segmentation information, such as including identification of bone locations and/or centerlines. Alternatively, the data represents the scanned region, and the processor 20 applies segmentation.

In another embodiment, the imaging system 18 is a workstation or computer for processing previously acquired data. Data is acquired by transfer from another device or from storage (e.g., PACS system). For example, the data is received from a data archival system or on a network.

The memory 22 is a tape, magnetic, optical, hard drive, RAM, buffer, cache, or other memory. The memory 22 stores the scan data from one or more scans, at different stages of processing, and/or as a rendered image. In one embodiment, the memory 22 stores C-arm x-ray data representing a left ventricle of a patient over at least one heart cycle. For example, the x-ray data is fluoroscopic images or frames of data representing different planes through the heart over time. The memory 22 may store data in different stages of processing, such as storing similarity values, results of calculations for determining similarity, a deformation field, the results of calculating or applying the deformation field, endocardium surfaces, epicardium surfaces, or other information.

The memory 22 or another memory (e.g., a remote database provided as a service through a network) stores the library of motion templates. The data representing different sample endocardium and corresponding epicardium sequences of surfaces is stored. Any number of sample sequences may be stored, such as about 100 samples. The stored sequences of surfaces may be acquired from the memory 22 for estimating the epicardium of a patient.

The memory 22 is additionally or alternatively a non-transitory computer readable storage medium with processing instructions. Data representing instructions executable by the programmed processor 20 is provided for left ventricle epicardium estimation in medical diagnostic imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 20 is one or more general processors, digital signal processors, application specific integrated circuits, field programmable gate arrays, controllers, analog circuits, digital circuits, servers, graphics processing units, graphics processors, combinations thereof, network, or other logic devices for matching surfaces, selecting surfaces, transforming surfaces, and applying transforms to other surfaces. A single device is used, but parallel or sequential distributed processing may be used. The processor 20 is configured by hardware and/or software to perform the various acts discussed herein.

The processor 20 is configured to select a template of the endocardium from a library of such templates. The templates are of the endocardium surface at different phases through the heart cycle. Different templates represent the position over time or motion of the endocardium for different conditions, different types of patients, or other variances associated with the endocardium in different patients.

The processor 20 is configured to select the template or templates most similar to an endocardium of a given patient. The endocardium of the given patient is obtained from the memory 22 or data transfer. Alternatively, the processor 20 detects the endocardium over time from fluoroscopy or C-arm x-ray data. Data from one or more sweeps or scans of a C-arm system, with or without contrast agents being in the patient, may used to detect the endocardium over time for the patient. Other imaging modes may be used for detecting a patient's endocardium over time.

Any similarity calculation may be performed. The endocardium surfaces of the templates are compared to the detected endocardium. The comparison calculates a distance, correlation, minimum sum of absolute differences or other value representing similarity. The template or templates associated with the sufficient or greatest similarity are selected.

The processor 20 determines endocardium motion based on the C-arm x-ray data and the template of endocardium motion. The shape of the endocardium through multiple phases is used in the similarity calculation. The surface (e.g., mesh or assigned locations) represents a shape of the endocardium. By using the shape at different times (e.g., different phases), the motion of the endocardium is determined. Rather than determine a velocity, the motion is determined as a sequence of different positions. A velocity based representation may alternatively be used. Spatial and temporal information for the endocardium is used to select the template or templates.

The processor 20 estimates an epicardium location at different phases over one or more heart cycles from the endocardium motion. The epicardium may be difficult to detect from the C-arm x-ray data. Instead, the relationship of the epicardium to the endocardium is used. The selected endocardium surfaces of the templates have corresponding epicardium surfaces. The templates model the relationship of the endocardium to the epicardium. Since the endocardium of a given patient may not match the endocardium of the selected template or templates, a non-rigid deformation to more closely match the endocardium surfaces is calculated. The deformation may then be applied to the epicardium surfaces of the templates. The result is a modeled or template epicardium surface transformed based on the actual, detected endocardium surface. The epicardium is estimated from one or more templates.

The display 24 is a CRT, LCD, projector, plasma, printer, or other display for displaying two-dimensional images or three-dimensional representations or renderings. The display 24 displays fluoroscopy, C-arm x-ray, CT or other images. The images rely on the estimated epicardium. For example, the epicardium may be highlighted with color or a graphic. As another example, the epicardium locations are used for reconstructing a volume from data representing a plurality of planes. For a C-arm sweep, data representing a plurality of planes is acquired. To reconstruct the planar data into volume data, the location of the different tissue structures, such as the epicardium, is used to determine the spatial relationships over time. The motion or locations at different phases may allow for more accurate reconstruction to a three-dimensional grid from data representing two-dimensional regions. The reconstructed volume may be rendered to an image, such as with projection or surface rendering.

Figure 3:
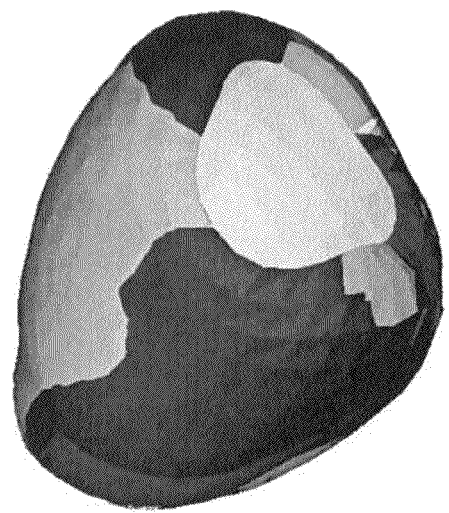
FIG. 3 is an example mesh overlay representing detected and actual epicardiums.

Using a leave-one-out method, the epicardium estimation accuracy may be tested. For example, twelve left ventricle fluoroscopy sequences are obtained. For each experiment, one sequence is used for testing and the remaining eleven sequences are used to build the motion library. The proposed method is used to estimate the epicardium of the test sequence and compare with the ground truth using the averaged point-to-mesh error. The procedure is repeated 12 times, until each sequence is used for testing once. The mean and standard deviation of epicardium estimation error may be 2.10±0.65 mm. FIG. 3 shows one example of overlaying the real epicardium mesh (lighter region) and the estimated mesh (darker region).

Figure 2A:
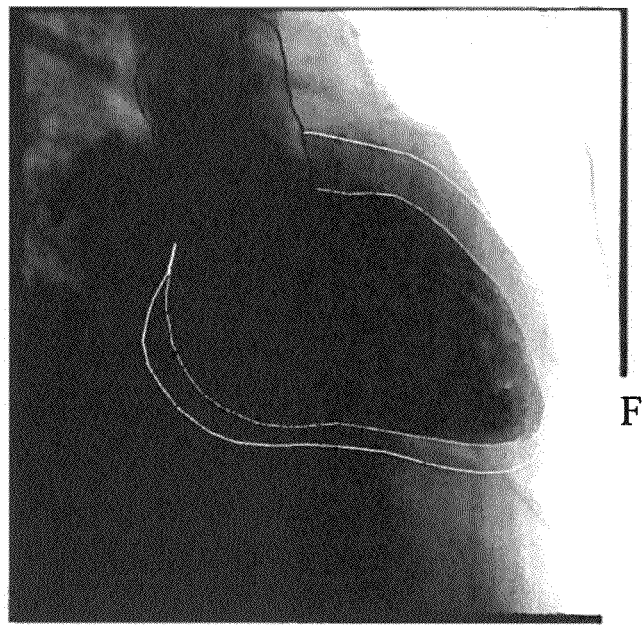
FIGS. 2A and 2B are example medical diagnostic images showing detected epicardiums.
Figure 2A:
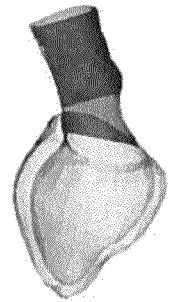
Figure 2B:
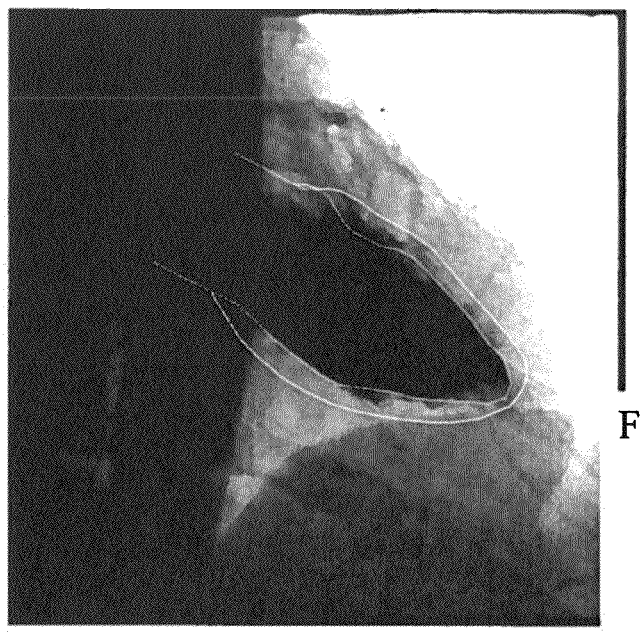
Figure 2B:
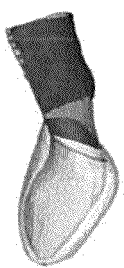

The performance of epicardium estimation may be tested on a rotational angiocardiogram dataset acquired for a patient. The 3D endocardium motion is estimated. The endocardium motion is then used to estimate the epicardium based on the motion library composed with twelve sequences. FIG. 2A shows images at an end-diastolic phase, and FIG. 2B shows images at an end-systolic phase. The LV endocardium and epicardium are shown in both 2D projection images and the 3D space. Visual inspection shows that the estimated epicardium has a realistic shape and motion pattern.

The LV epicardium is estimated based on the endocardium shape and motion. The estimated epicardium, together with the endocardium, may provide an accurate motion field for motion-compensated reconstruction of the LV from rotational angiocardiograms. Different endocardium mesh distance metrics (e.g., the Procrustes distance) may be used. Algorithms based on principal component analysis or manifold learning may be used to extract a general pattern between the motion of endocardium and epicardium. The relationship between the endocardium and epicardium may be captured outside of the templates and the resulting function used in the estimation of the epicardium.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for left ventricle epicardium estimation in medical diagnostic imaging, the method comprising:
    acquiring C-arm x-ray data representing a left ventricle of a patient over time;
    detecting an endocardium over time from the C-arm x-ray data;
    identifying, with a processor, at least one motion template from a library of motion templates, the identifying being based on a similarity of the endocardium over time detected from the C-arm x-ray data with an endocardium of the at least one motion template, wherein the similarity is calculated by calculating a difference between the endocardium detected from the C-arm x-ray data and the endocardium of each of the motion templates of the library at each of a plurality of heart cycle phases, averaging the differences over the heart cycle phases for each motion template, and identifying the at least one motion template as having a least of the average difference;
    calculating, with the processor, a deformation field as a function of a difference between the endocardium of the at least one motion template and the endocardium detected from the C-arm x-ray data;
    applying, with the processor, the deformation field to an epicardium represented by the at least one motion template; and
    displaying an image of the left ventricle of the patient, the image being a function of the epicardium as deformed by the applied deformation field.

2. The method of claim 1 wherein acquiring comprises acquiring with a single sweep of a C-arm.

3. The method of claim 1 wherein identifying comprises identifying from the library, the library of motion templates generated from computed tomography or magnetic resonance data.

4. The method of claim 1 wherein identifying comprises identifying from the library comprising at least one hundred motion templates, each of the motion templates representing different patients.

5. A method for left ventricle epicardium estimation in medical diagnostic imaging, the method comprising:
    acquiring C-arm x-ray data representing a left ventricle of a patient over time;
    detecting an endocardium over time from the C-arm x-ray data;
    identifying, with a processor, at least five motion templates from a library of motion templates, the identifying being based on a similarity of the endocardium over time detected from the C-arm x-ray data with an endocardium of the at least five motion templates, wherein the similarity is calculated between the detected endocardium and the library of motion templates;
    calculating, with the processor, a deformation field as a function of differences, including the difference, between the endocardium of the at least five motion templates and the endocardium detected with the C-arm x-ray data;
    applying, with the processor, the deformation field to an epicardium represented by the at least five motion templates, wherein applying further comprises estimating, with a weighted average function, the epicardium of the C-arm x-ray data from the epicardium of the at least five motion templates as deformed by the deformation field; and
    displaying an image of the left ventricle of the patient, the image being a function of the epicardium as deformed by the applied deformation field.

6. The method of claim 1 wherein calculating comprises determining the difference between the endocardiums with a non-rigid deformation.

7. The method of claim 1 wherein calculating comprises interpolating with a thin plate spline function.

8. The method of claim 1 wherein the at least one motion template comprises a first mesh as the endocardium and a second mesh as the epicardium, and wherein applying comprises estimating the epicardium of the C-arm x-ray data from the epicardium of the at least one motion template as deformed by the deformation field.

9. In a non-transitory computer readable storage medium having stored therein data representing instructions executable by a programmed processor for left ventricle epicardium estimation in medical diagnostic imaging, the storage medium comprising instructions for:
    selecting a first endocardium surface from a library of endocardium surfaces based on matches in shape over time from a second endocardium surface for a patient, by calculating a difference between the second endocardium surface for a patient and the endocardium of each of the motion templates of the library of endocardium surfaces at each of a plurality of heart cycle phases, averaging the differences over the heart cycle phases for each motion template, and selecting the at least one motion template as having a least of the average difference;
    determining a distortion of the selected first endocardium surface to the second endocardium surface;

applying the distortion to a first epicardium surface associated with the selected endocardium surface and from the library; and estimating a second epicardium surface of the patient as the first epicardium surface.

10. The non-transitory computer readable storage medium of claim 9 wherein selecting comprises:

determining a level of match between the second endocardium surface of the patient and each of a plurality of endocardium surfaces in the library;

repeating the determining for each of a plurality of heart phases, the endocardium surfaces of the library and the second endocardium surface being represented over the heart phases;

calculating a spatial-temporal match for each of the different endocardium surfaces of the library from the second endocardium surface as a function of the levels from the heart phases;

selecting the first endocardium surface from the library as a function of the spatial-temporal match.

11. The non-transitory computer readable storage medium of claim 9 wherein selecting comprises selecting the first endocardium surface and a plurality of third endocardium surfaces from the library, wherein determining the distortion comprises determining third distortions of the selected third endocardium surfaces, and wherein applying comprises weighted averaging based on the distortion and the third distortions.

12. The non-transitory computer readable storage medium of claim 9 wherein the second endocardium surface is detected from C-arm x-ray data obtained in a single sweep, wherein the endocardium surfaces of the library are generated from computed tomography or magnetic resonance data.

13. The non-transitory computer readable storage medium of claim 9 wherein determining the distortion comprises transforming the first endocardium surface towards the second endocardium surface with a non-rigid transform.

14. The non-transitory computer readable storage medium of claim 9 wherein estimating comprises using the first epicardium surface as the second epicardium surface.

15. A system for left ventricle epicardium estimation in medical diagnostic imaging, the system comprising:

a memory configured to store C-arm x-ray data representing a left ventricle over at least one heart cycle; and a processor configured to determine endocardium motion based on the C-arm x-ray data and a template of endocardium motion based on a similarity between the C-arm x-ray data endocardium motion and the template of endocardium motion, wherein the processor selects the template from a library of templates, the selection based on a similarity of the template to an endocardium detected from the C-arm x-ray data, to determine the endocardium motion based on endocardium shapes, over a plurality of phases of the at least one heart cycle, for the template and from the C-arm x-ray data, and configured to estimate an epicardium location over the at least one heart cycle from the endocardium motion; and wherein the similarity is calculated by calculating a difference between the endocardium detected from the C-arm x-ray data and the endocardium of each of the motion templates of the library at each of a plurality of heart cycle phases, averaging the differences over the heart cycle phases for each motion template, and identifying the at least one motion template as having a least of the average difference;

the processor is configured to calculate a deformation field as a function of a difference between the endocardium of the at least one motion template and the endocardium detected from the C-arm x-ray data; wherein the processor is configured to apply the deformation field to an epicardium represented by the at least one motion template; and a display configured to display an image of the left ventricle of the patient, the image being a function of the epicardium as deformed by the applied deformation field.

16. The system of claim 15 wherein the processor is configured to estimate the epicardium location based on a transform of the template of endocardium motion to the endocardium motion based on the C-arm x-ray data.

17. The system of claim 15 wherein the processor is configured to estimate the epicardium location from a plurality of templates of endocardium motion.

* * * * *